United States Patent [19]

Manring et al.

[11] 4,142,907
[45] Mar. 6, 1979

[54] HIGH SODIUM OXIDE COMPOSITION USEFUL IN THE MANUFACTURE OF GLASS

[75] Inventors: William H. Manring, Hamilton, Ohio; Patrick M. DeBello, Lincroft; Eugene G. Imperato, Willingboro, both of N.J.

[73] Assignee: FMC Corporation, Philadelphia, Pa.

[21] Appl. No.: 904,947

[22] Filed: May 11, 1978

Related U.S. Application Data

[63] Continuation-in-part of Ser. No. 755,636, Dec. 30, 1976, abandoned.

[51] Int. Cl.$^2$ .............................................. C03C 3/04
[52] U.S. Cl. ........................................ 106/52; 65/134; 106/50; 106/51; 106/54; 106/73.6; 106/78; 106/DIG. 8; 423/206 T; 423/334
[58] Field of Search ............ 106/51, 52, 73.6, DIG. 8, 106/74, 78; 65/134; 423/334, 206 T, 206 R

[56] References Cited

U.S. PATENT DOCUMENTS

| | | | |
|---|---|---|---|
| 2,243,027 | 5/1941 | Baker | 423/334 |
| 2,644,742 | 7/1953 | Danison | 423/334 |
| 2,976,161 | 3/1961 | Smith | 106/DIG. 8 |
| 3,268,350 | 8/1966 | Grebe et al. | 106/51 X |
| 3,294,505 | 12/1966 | Garrison | 106/DIG. 8 |
| 3,354,245 | 11/1967 | Foster | 106/73.6 |
| 3,508,866 | 4/1970 | Burke | 423/334 |
| 3,607,189 | 9/1971 | Manrine | 65/134 |
| 3,819,805 | 6/1974 | Graves et al. | 423/206 T |
| 3,823,676 | 7/1974 | Cook et al. | 423/260 T |
| 3,833,388 | 9/1974 | Ohlberg | 106/DIG. 8 |
| 3,924,030 | 12/1975 | Tatara et al. | 106/DIG. 8 |
| 3,955,956 | 5/1976 | Terner | 106/DIG. 8 |

FOREIGN PATENT DOCUMENTS

451659  3/1975  U.S.S.R. ..................... 106/74

OTHER PUBLICATIONS

Young, J. C. et al. "Density of Some Soda-Potash-Silica Grasses as a Function of Composition" — J. Res. 106-152 Nat'l Bu. Stds. (1939).
Dyni, J. R. et al. "Thermal Method for Quantitative Determination of Nahcowite in Colorado Oil Shale" —Geol. Survey Res. (1971) B194-B198, Kirk-Othmer-Encycl. of Chem. Tech. vol. 15 (p. 284).
Cobb, J. W., "Synthesis of a Glaze, Glass or Other Complex Silicate" J. Soc. Chem. Ind. 29, (1910) pp. 399-403.

*Primary Examiner*—Helen McCarthy
*Attorney, Agent, or Firm*—Robert W. Kell; Frank Ianno

[57] ABSTRACT

A high sodium oxide composition suitable for use in the manufacture of glass and fiber glass is prepared by heating a sodium carbonate ore with a silicate or other source of glass making oxides such as clay or oil shale. The product obtained is rich in sodium, calcium and magnesium oxides and contains less than 35 weight percent $SiO_2$. It may be substituted for soda ash in a glass batch and will reduce the fuel required in glass manufacturing.

20 Claims, No Drawings

HIGH SODIUM OXIDE COMPOSITION USEFUL IN THE MANUFACTURE OF GLASS

The present application is a continuation-in-part of co-pending application Ser. No. 755,636, filed Dec. 30, 1976, now abandoned, and relates broadly to glass manufacture and more particularly to the preparation of a high sodium oxide composition containing other glass forming oxides such as potassium oxide, aluminum oxide, calcium oxide, magnesium oxide and minor amounts (less than 35 weight percent) of silicon dioxide.

In nearly all glass manufactured in commercial quantities, silica, silicon dioxide ($SiO_2$) is the primary constituent. Silica is also the most readily available and least costly constituent of a glass batch. Pure silica glass requires a very high temperature to melt and work. Therefore, alkali and alkaline earth metal oxides are secondary constituents added to reduce glass melting and forming temperatures. The alkali most commonly used is soda ash ($Na_2CO_3$). The alkaline earth (calcium and magnesium) oxides are derived from naturally occurring limestone and dolomite. These soda-lime glasses comprise, tonnage-wise, about 90% of total glass manufacture.

One source of soda ash is the naturally occurring trona ($Na_2CO_3.NaHCO_3.2H_2O$) large deposits of which are located in the Green River formation in the Bridger and Washakie Basins north of the Uinta Mountains in southwestern Wyoming. These deposits may contain as much as 10% of water-insoluble material, chiefly calcium and magnesium carbonate and silica. The impurities may be removed by dissolving the trona in hot water and filtration. Pure sodium carbonate is recovered from solution by precipitation, filtration and calcination.

Glass manufacturing plants are located in the population centers on both coasts and in the midwest, far removed from the trona ore, mined in southwestern Wyoming. The refined product must, therefore, be shipped long distances in hopper rail cars and freight charges have a large economic impact on consumer costs. Forty-two percent of the sodium carbonate transported ($Na_2CO_3$ contains 42% $CO_2$) is expelled from the batch during the glass melting process and is useless in terms of contributing to the total yield of glass.

In accordance with the present invention, a sodium carbonate ore such as trona is heated with other minerals containing desirable glass forming oxides such as potassium oxide, aluminum oxide, magnesium oxide, and calcium oxide to decompose the carbonates, which are of no value in the manufacture of glass, and form a high sodium oxide composition. Throughout the specification, the term "high sodium oxide composition" shall mean a preheated mineral composition containing from about 25 weight percent to as much as 58 weight percent of sodium (determined as sodium oxide) together with other glass forming oxides such as potassium oxide, aluminum oxide, magnesium oxide, calcium oxide and minor amounts (less than 35 weight percent) of silicon dioxide.

While trona is the preferred sodium oxide ore, other sodium oxide ores useful in the practice of the present invention are:

Thermonatrite — $Na_2CO_3.H_2O$
Natron — $Na_2CO_3.10H_2O$
Pirsonnite — $Na_2CO_3.CaCO_3.2H_2O$
Gaylussite — $Na_2CO_3.CaCO_3.5H_2O$
Dawsonite — $NaAlCO_3(OH)_2$
Shortite — $Na_2CO_3.2CaCO_3$, and
Nahcolite — $NaHCO_3$ The chemical analysis of the high sodium oxide composition will vary depending on the amount and chemical composition of the particular silicate or other source of glass making oxide and sodium carbonate ore that are mixed prior to heating. Preferred compositions are those containing the aluminum, magnesium and calcium oxides that are useful in the manufacture of glass, characterized by a sodium content (determined as sodium oxide) of from about 25 to as much as 58 weight percent. The ratio of sodium oxide to aluminum, magnesium and calcium oxides is preferably in the range of from about 0.67:1 to about 1.13:1. Particularly preferred are sodium oxide compositions containing from about 25 to about 40 weight percent sodium (determined as sodium oxide) and a ratio of sodium oxide to magnesium and calcium oxides of from about 0.76:1 to about 1.44:1. Economically advantageous high sodium oxide compositions are those containing minor amounts (less than 35 weight percent) of silicon dioxide and a ratio of silicon dioxide to sodium, potassium, aluminum, calcium and magnesium oxides in the range of from about 0.35:1 to about 0.57:1.

Suitable silicates for reacting with a sodium oxide ore to produce the high sodium oxide composition of the present invention are shale, low silica clays, and phosphate slag. Particularly preferred are the oil shales which may be oxidized to supply some of the energy required to decompose sodium carbonates. The advantages of the present invention are many:

(1) The glass manufacturer does not pay freight on the carbonate (42% of soda ash) that is decomposed and lost at glass furnace temperatures. All of the high sodium oxide composition delivered to the plant site is reactive and there are no losses through decomposition.

(2) The decomposition of sodium carbonate to form carbonate dioxide is an endothermic reaction that requires more heat input to the glass furnace. Approximately 40 gallons of oil is required to fuse one ton of glass. The use of a preheated, substantially carbonate free glass making composition saves fuel.

(3) The production of glass in electric furnaces has increased with the accelerating cost of oil and is expected to increase further in the future. The economics of glass manufacture in an electric furnace are related to maintaining an insulating blanket (of glass batch) on the surface of the melt. The maintenance of such an insulating layer is not critical in a conventional oil or gas fired furnace but is essential to the efficient operation of an electric glass furnace. The high sodium oxide composition of the present invention provides a substantial advantage over soda ash in the manufacture of glass in an electric furnace because carbon dioxide has been driven off during the preheating step. By contrast, the use of soda ash in an electric furnace decreases efficient utilization of heat as the carbon dioxide that is driven off interferes with the insulating blanket.

(4) The trona stratus in the Green River formation may be 8 to 10 feet thick and located at a depth of about 1,600 feet below the surface. The trona ore may be recovered by room and pillar mining and since oil shale is directly adjacent to the trona stratus, some of this oil shale is unavoidably removed with the trona. The oil shale is separated with other insolubles during the purification step described above, and accumulates on the surface of the ground as mine tailings. Such mine tailings may average 15-32 gallons of oil per ton and there is enough heat energy present in the oil to provide for up to 90% of the total fuel required for fusion of the trona ore. Powdered coal firing may be used for any additional fuel that may be needed to decompose the carbonates.

It is another advantage of the present invention, therefore, that raw trona ore may be heated with tailings from the mine thereby solving a disposal problem and converting a waste product into a commercially saleable product substantially free of water, carbon dioxide, hydrocarbons and other compounds that do not contribute to glass yield. The $SiO_2$, $Al_2O_3$, CaO, MgO and other impurities in the trona remain in the product. The oil present in the mine tailings contribute to the energy requirements of the reaction. The mine tailings also contribute substantial amounts of CaO, MgO, $Na_2O$, and $K_2O$ which are fused into the final composition.

EXAMPLE 1

This example illustrates the use of oil shale in the production of a high sodium oxide composition.

One thousand pounds of raw trona ore (containing 12.5% by weight) of water-insoluble material is intimately mixed with 1,350 pounds of mine run floor oil shale (analyzing 4.48 gallons of water and 31.96 gallons of oil per ton). The mixture is charged into a melting furnace and heated to 2,600° F. (1,427° C.). The oil burns and molten residue is run out into a water Bosch. Twelve hundred and twenty-two pounds of dry granulated high sodium oxide composition is obtained. The anlaysis of the starting materials, and final product (high sodium oxide composition) is summarized in Table 1.

TABLE I

| | Pounds of Oxide In: | | | |
|---|---|---|---|---|
| | 1000 lbs. Trona | 1350 lbs. Floor Shale | 1222 lbs. Product | Weight % of Oxides in Product |
| $SiO_2$ | 32 | 280 | 312 | 25.5 |
| $Al_2O_3$ | 6 | 77 | 83 | 6.8 |
| $Fe_2O_3$ | 3 | 29 | 32 | 2.6 |
| CaO | 23 | 183 | 206 | 16.9 |
| MgO | 9 | 91 | 100 | 8.2 |
| $Na_2O$ | 364 | 78 | 442 | 36.2 |
| $K_2O$ | 3 | 44 | 47 | 3.8 |

The yield based on the total weight of trona and oil shale charged to the furnace is 52%. Most of the heat required by the reaction was supplied by the oil in the shale.

EXAMPLE 2

This example illustrates the use of spent oil shale in the production of a high sodium oxide composition. One thousand four hundred pounds of low grade oil shale (analyzing 5.91 gallons of water and 2.61 gallons of oil per ton) is heated at 2,000° F. (1,093° C.) for 1-½ hours to remove the oil, decompose the carbonate materials and burn off any residual oil or other carbonaceous residue. The burned spent shale residue (950 pounds) is intimately mixed with 1,000 pounds of raw trona ore (containing 12.5% insoluble material) and heated at 2,700° F. (1,482° C.) for one hour until the evolution of carbon dioxide ceases. The residual product (high sodium oxide composition) weighs 1,390 pounds and the analytical data is summarized in Table 2.

TABLE II

| | Pounds of Oxide In: | | | |
|---|---|---|---|---|
| | 1000 lbs. Trona | 950 lbs. Spent Shale | 1390 lbs. of Product | Weight % of Oxides in Product |
| $SiO_2$ | 32 | 416 | 448 | 32.2 |
| $Al_2O_3$ | 6 | 54 | 60 | 4.3 |
| $Fe_2O_3$ | 3 | 18 | 21 | 1.5 |
| CaO | 23 | 206 | 229 | 16.5 |
| MgO | 9 | 180 | 189 | 13.6 |
| $Na_2O$ | 364 | 42 | 406 | 29.2 |
| $K_2O$ | 3 | 34 | 37 | 2.7 |

The yield based on the total weight of trona and spent shale charged to the furnace is 71%.

EXAMPLE 3

This example illustrates the use of oil shale in the production of a high sodium oxide composition.

A 35.6% sodium oxide composition for use as a glass-melting raw material is prepared as described in Example 1 above. Mine run, crushed oil shale containing 32 gallons of oil per ton is mixed with raw crushed trona ore in the ratio of 1,000 pounds trona to 1,350 pounds floor oil shale.

This mixture is ignited and fused in a glass furnace. The molten fusion is granulated by directing the molten hot fused mixture (2,700° F.; 1,482° C.) into a chamber cooled with water sprays.

The granulated, dry material is screened — and particles over 4.76 millimeters (No. 4 U.S. Standard Sieve) are crushed to −4 mesh. The screened material is a very high lime, high $Na_2O$ glass free of hydrocarbon impurities and does not absorb water or carbon dioxide readily. It may be stockpiled and blended outdoors since it does not need protection or special bins. The total yield of product (high sodium oxide composition) is 1,251 pounds and the analytical data is summarized in Table III.

TABLE III

| | Pounds of Oxide In: | | | |
|---|---|---|---|---|
| | 1000 lbs. Trona | 1350 lbs. of Oil Shale | 1435 lbs. of Product | Weight % of Oxides in Product |
| $SiO_2$ | 32 | 396 | 428 | 29.8 |
| $Al_2O_3$ | 6 | 101 | 107 | 7.5 |
| $Fe_2O_3$ | 3 | 46 | 49 | 3.4 |
| CaO | 23 | 193 | 216 | 15.0 |
| MgO | 9 | 148 | 157 | 10.9 |
| $Na_2O$ | 364 | 58 | 422 | 29.4 |
| $K_2O$ | 3 | 53 | 56 | 3.9 |

The yield based upon the total weight of trona and oil shale charged to the furnace is 61%. The total $Na_2O$ and $K_2O$ in this product is 33.3%.

EXAMPLE 4

This example illustrates the use of a high sodium oxide composition in the manufacture of plate glass and compares the composition of a glass batch (using a high sodium oxide composition) with that of a conventional glass batch which produces a plate glass having similar properties and analysis.

TABLE IV

| Batching Ingredients | Regular Batch (Pounds) | Batch Made With High $Na_2O$ Composition (Pounds) |
|---|---|---|
| Sand | 2000 | 2000 |
| Soda Ash | 589 | — |

TABLE IV-continued

| Batching Ingredients | Regular Batch (Pounds) | Batch Made With High $Na_2O$ Composition (Pounds) |
|---|---|---|
| Dolomite Limestone | 295 | — |
| Calcium Limestone | 410 | 181 |
| Salt Cake | 105 | 50 |
| Carbon | 4 | 1 |
| Rouge | 2 | 0 |
| Cullet | 1200 | 1200 |
| High $Na_2O$ Composition of Example 1 | 0 | 1103 |

The yield of glass from the high sodium oxide composition batch was higher (2.21 tons) than that from the regular glass batch (1.99 tons). The chemical composition of the two glasses is given in Table V.

TABLE V

| | Regular Glass | Glass Using High $Na_2O$ Composition | Difference |
|---|---|---|---|
| $SiO_2$ | 71.8 | 71.00 | − 0.8 |
| $Al_2O_3$ | 0.2 | 1.75 | + 1.55 |
| $Fe_2O_3$ | 0.12 | 0.7 | + 0.58 |
| CaO | 11.30 | 9.57 | − 1.73 |
| MgO | 2.30 | 2.66 | + 0.36 |
| $Na_2$ | 14.00 | 13.31 | − 0.69 |
| $K_2O$ | Trace | 0.9 | + 0.9 |
| $SO_3$ | 0.30 | 0.3 | — |
| TOTAL | 100. | 100. | |

EXAMPLE 5

This example illustrates the use of a high sodium oxide composition in the manufacture of fiber glass and compares the glass batch obtained using the high sodium oxide composition with that of a conventional glass batch that produces fiber glass having similar properties.

TABLE VI

| Batch Ingredients | Regular Batch (Pounds) | Batch Made With High $Na_2O$ Composition (Pounds) |
|---|---|---|
| Sand | 2000 | 2000 |
| Soda Ash | 730 | — |
| Burnt Lime | 400 | 79 |
| Razorite | 480 | 573 |
| Fluor Spar | 20 | 48 |
| Aplite | 620 | 310 |
| Salt Cake | 20 | 48 |
| High $Na_2O$ Composition of Example 3 | | 1290 |

The chemical composition of the two glasses is given in Table VII.

TABLE VII

| | Regular Glass | Glass Using High $Na_2O$ Composition | Difference |
|---|---|---|---|
| $SiO_2$ | 60.9 | 60.9 | 0 |
| $Al_2O_3$ | 3.8 | 3.8 | 0 |
| $Fe_2O_3$ | 1.2 | 0.8 | − 0.4 |
| CaO | 7.2 | 7.6 | + 0.4 |
| MgO | 4.3 | 3.3 | − 1.0 |
| $Na_2O$ | 15.5 | 15.1 | − 0.4 |
| $K_2O$ | 0.4 | 1.4 | + 1.0 |
| $B_2O_3$ | 7.4 | 7.1 | − 0.3 |
| $F_2$ | 0.2 | 0.3 | + 0.1 |
| $SO_3$ | 0.2 | 0.3 | + 0.1 |

EXAMPLE 6

This example illustrates the use of a phosphate rock slag in the production of a high sodium oxide composition.

In the commercial manufacture of phosphorus from phosphate rock, the phosphate rock is crushed and heated in an electric furnace with silica and limestone. After recovery of the phosphorus and ferrophos, a residue slag of little commercial value must be removed from the furnace.

The phosphate slag residue obtained from phosphorus manufacture as described above is crushed, and 953 parts by weight is mixed with 1,000 parts by weight of raw trona ore. The mixture is fused by heating at 2,500° F. (1,371° C.) for one hour with the evolution of carbon dioxide to give 1,393 parts by weight of a high sodium oxide composition useful in the manufacture of glass. The chemical analysis of the phosphate slag, raw trona ore and product (high sodium oxide composition) is summarized in Table VIII.

TABLE VIII

| | Pounds of Oxide In: | | | |
|---|---|---|---|---|
| | 1000 lbs. Trona | 953 lbs. Phosphate Slag | 1393 lbs. of Product | Weight % of Oxides in Product |
| $SiO_2$ | 32 | 424 | 456 | 32.7 |
| $Al_2O_3$ | 6 | 62 | 68 | 4.9 |
| $Fe_2O_3$ | 3 | 6 | 9 | 0.6 |
| CaO | 23 | 443 | 466 | 33.5 |
| MgO | 9 | 8 | 17 | 1.2 |
| $Na_2O$ | 364 | 5 | 369 | 26.5 |
| $K_2O$ | 3 | 5 | 8 | 0.6 |

The yield based on the total weight of trona and phosphate slag charged to the furnace is 71%.

EXAMPLE 7

This example illustrates the use of bentonite in the production of a high sodium oxide composition.

One thousand parts by weight of raw trona ore is intimately mixed with 1,000 parts by weight of bentonite and the mixture is fused by heating to 2,500° F. (1,371° C.) for one hour to give 1,300 parts by weight of a high sodium oxide composition useful in the manufacture of glass. The chemical analysis of the raw trona ore, bentonite and product (high sodium oxide composition) is summarized in Table IX.

TABLE IX

| | Pounds of Oxide In: | | | |
|---|---|---|---|---|
| | 1000 lbs. Trona | 1000 lbs. Bentonite | 1300 lbs. of Product | Weight % of Oxides in Product |
| $SiO_2$ | 32 | 421 | 453 | 34.8 |
| $Al_2O_3$ | 6 | 267 | 273 | 21.0 |
| $Fe_2O_3$ | 3 | 55 | 58 | 4.5 |
| CaO | 23 | 35 | 58 | 4.5 |
| MgO | 9 | 31 | 40 | 3.1 |
| $Na_2O$ | 364 | 44 | 408 | 31.4 |
| $K_2O$ | 3 | 8 | 11 | 0.8 |

The yield based on the total weight of trona and bentonite charged to the furnace is 65%.

EXAMPLE 8

This example illustrates the use of mine run tailings in the production of a high sodium oxide composition. One thousand pounds of raw trona ore (containing 12% by weight of water-insoluble material) is intimately mixed with 1,600 pounds of mine tailings (analyzing 7.3 gallons of water and 23.5 gallons of oil per ton). The mixture is charged into a melting furnace and heated to 1,850°–2,500° F. (1,010°–1,371° C.). The oil burns with a smoky flame and molten residue is run out into a water Bosch. Fourteen hundred and thirty-nine pounds of a dry granulated sodium oxide composition is obtained.

The analysis of the starting materials, and final product is summarized in Table X.

TABLE X

| | Pounds of Oxide In: | | | Weight % of Oxides in Product |
|---|---|---|---|---|
| | 1000 lbs. Trona | 1600 lbs. Tailings | 1439 lbs. Product | |
| $SiO_2$ | 31 | 373 | 404 | 28.1 |
| $Al_2O_3$ | 6 | 68 | 74 | 5.1 |
| $Fe_2O_3$ | 3 | 31 | 34 | 2.4 |
| CaO | 22 | 275 | 297 | 20.6 |
| MgO | 8 | 101 | 109 | 7.6 |
| $Na_2O$ | 366 | 113 | 479 | 33.3 |
| $K_2O$ | 3 | 39 | 42 | 2.9 |

The yield based upon the total weight of trona and mine tailings charged to the furnace is 55%. The total sodium oxide and potassium oxide in this composition is 36.2%.

EXAMPLE 9

This example illustrates the use of a high sodium oxide composition in the manufacture of plate glass and compares the composition of a glass batch (using the product of Example 8) with that of a conventional glass batch which produces a plate glass having similar properties and analysis.

TABLE XI

| Batch Ingredients | Regular Batch (Pounds) | Batch Made With High $Na_2O$ Composition (Pounds) |
|---|---|---|
| Sand | 2000 | 2000 |
| Soda Ash | 589 | — |
| Dolomite Limestone | 295 | — |
| Calcium Limestone | 410 | 189 |
| Salt Cake | 105 | 50 |
| Carbon | 4 | 1 |
| Rouge | 2 | — |
| Cullet | 1200 | 1200 |
| High $Na_2O$ Composition of Example 8 | 0 | 1200 |

The yield of glass from the high sodium oxide composition was higher (2.26 tons) than that from the regular glass batch (1.98 tons). The chemical compositions of the two glasses is given in Table XII.

TABLE XII

| | Regular Glass | Glass Using High $Na_2O$ Composition | Difference |
|---|---|---|---|
| $SiO_2$ | 71.8 | 70.7 | − 1.01 |
| $Al_2O_3$ | 0.2 | 1.4 | + 1.2 |
| $Fe_2O_3$ | 0.12 | 0.7 | + 0.58 |
| CaO | 11.3 | 10.8 | − 0.50 |
| MgO | 2.3 | 2.6 | + 0.3 |
| $Na_2O$ | 14.0 | 13.0 | − 1.0 |
| $K_2O$ | Trace | 0.8 | + 0.8 |
| $SO_3$ | 0.30 | 0.3 | — |
| TOTAL | 100 | | |

The analyses of the high sodium oxide compositions illustrated by the above examples are summarized in the following table.

While typical formulations and procedures embodying the present invention have been cited above, it will be understood that they are intended to be illustrative only and are not intended to limit the scope of the invention.

TABLE XIII

| Example | 1 | 2 | 3 | 6 | 7 | 8 |
|---|---|---|---|---|---|---|
| Table | I | II | III | VIII | IX | X |
| $SiO_2$ | 25.5 | 32.2 | 29.8 | 32.7 | 34.8 | 28.1 |
| $Al_2O_3$ | 6.8 | 4.3 | 7.5 | 4.9 | 21.0 | 5.1 |
| CaO | 16.9 | 16.5 | 15.0 | 33.5 | 4.5 | 20.6 |
| MgO | 8.2 | 13.6 | 10.9 | 1.2 | 3.1 | 7.6 |
| $Na_2O$ | 36.2 | 29.2 | 29.4 | 26.5 | 31.4 | 33.3 |
| $K_2O$ | 3.8 | 2.7 | 3.9 | 0.6 | 0.8 | 2.9 |
| MgO + CaO | 25.1 | 30.1 | 25.9 | 34.7 | 7.6 | 28.2 |
| $Na_2O$:MgO + CaO | 1.44 | 0.97 | 1.13 | 0.76 | 4.13 | 1.18 |
| MO* | 71.9 | 66.3 | 66.7 | 66.7 | 60.8 | 69.5 |
| $SiO_2$:MO | 0.35 | 0.49 | 0.44 | 0.49 | 0.57 | 0.40 |
| XO** | 31.9 | 34.4 | 33.4 | 39.6 | 28.6 | 33.3 |
| $Na_2O$:XO | 1.13 | 0.85 | 0.88 | 0.67 | 1.10 | 1.0 |

*MO = the combined weight percent of $Na_2O$, $K_2O$, $Al_2O_3$, CaO and MgO.
**XO = the combined weight percent of $Al_2O_3$, CaO and MgO.

What is claimed is:

1. A dry granulated prefused high sodium oxide composition that does not readily absorb water or carbon dioxide and is substantially free of carbonates consisting essentially of sodium, potassium, aluminum, magnesium, silicon and calcium oxides, useful as an additive in the manufacture of glass; said composition being characterized by a sodium content (determined as sodium oxide) of from 25 to as much as 58 weight percent and a silica content of less than 35 weight percent, the ratio of sodium oxide to aluminum, magnesium and calcium oxides being in the range of from about 0.67:1 to about 1.13:1 and the ratio of silicon dioxide to sodium, potassium, aluminum, calcium and magnesium oxides being in the range of from about 0.35:1 to about 0.57:1.

2. The high sodium oxide composition of claim 2 containing from about 25 to about 40 weight percent sodium oxide and characterized by a ratio of sodium oxide to magnesium and calcium oxides of from about 0.76:1 to about 1.44:1.

3. A dry granulated prefused high sodium oxide composition that does not readily absorb water or carbon dioxide and is substantially free of carbonates useful as an additive in the manufacture of glass obtained by (a) heating a mixture of a silicate selected from the group consisting of shale, low silicate clays and phosphate slag with a sodium carbonate ore until substantially all of the carbonates present in said ore are decomposed to form carbon dioxide said composition consisting essentially of sodium, potassium, aluminum, magnesium, silicon and calcium oxides and being characterized by a sodium content (determined as sodium oxide) of from 25 to as much as 58 weight percent and a silica content of less than 35 weight percent, the ratio of sodium oxide to aluminum, magnesium and calcium oxides being in the range of from about 0.67:1 to about 1.13:1, and the ratio of silicon dioxide to sodium, potassium, aluminum, calcium and magnesium oxides being in the range of from about 0.35:1 to about 0.57:1, and (b) granulating the product so obtained.

4. The composition of claim 3 wherein the sodium carbonate ore is trona.

5. The composition of claim 3 wherein the sodium carbonate ore is nahcolite.

6. The composition of claim 3 wherein the silicate is phosphate rock slag.

7. The composition of claim 3 wherein the silicate is bentonite.

8. A dry granulated prefused high sodium oxide composition that does not readily absorb water or carbon dioxide and is substantially free of carbonates useful as an additive in the manufacture of glass obtained by (a) heating a mixture of spent oil shale with a sodium carbonate ore until substantially all of the carbonates present in said ore are decomposed to form carbon dioxide said composition consisting essentially of sodium, potassium, aluminum, magnesium, silicon and calcium oxides and being characterized by a sodium content (determined as sodium oxide) of from 25 to as much as 58 weight percent and a silica content of less than 35 weight percent, the ratio of sodium oxide to aluminum, magnesium and calcium oxides being in the range of from about 0.67:1 to about 1.13:1, and the ratio of silicon dioxide to sodium, potassium, aluminum, calcium and magnesium oxides being in the range of from about 0.35:1 to about 0.57:1, and (b) granulating the product so obtained.

9. The composition of claim 8 wherein the sodium carbonate ore is trona.

10. The composition of claim 8 wherein the sodium carbonate ore is nahcolite.

11. A dry granulated prefused high sodium oxide composition that does not readily absorb water or carbon dioxide and is substantially free of carbonates useful as an additive in the manufacture of glass obtained by mixing oil shale with a sodium carbonate ore, and heating the mixture to a temperature sufficiently high to ignite and burn the combustibles present in said oil shale and decompose substantially all of the carbonates present in said ore to form carbon dioxide said composition consisting essentially of sodium, potassium, aluminum, magnesium, silicon and calcium oxides and being characterized by a sodium content (determined as sodium oxide) of from 25 to as much as 58 weight percent and a silica content of less than 35 weight percent, the ratio of sodium oxide to aluminum, magnesium and calcium oxides being in the range of from about 0.67:1 to about 1.13:1 and the ratio of silicon dioxide to sodium, potassium, aluminum, calcium and magnesium oxides being in the range of from about 0.35:1 to about 0.57:1, and (b) granulating the product so obtained.

12. The composition of claim 11 wherein the sodium carbonate ore is trona.

13. The composition of claim 11 wherein the sodium carbonate ore is nahcolite.

14. A dry granulated prefused high sodium oxide composition that does not readily absorb water or carbon dioxide and is substantially free of carbonates consisting essentially of silica, about 36 weight percent sodium oxide and about 32 weight percent of aluminum, magnesium and calcium oxides, useful in the manufacture of glass, obtained by (a) mixing oil shale with a sodium ore, heating the mixture to a temperature sufficiently high to ignite and burn the combustibles present in said oil shale and decompose substantially all of the carbonates present in said ore to form carbon dioxide and (b) granulating the resulting product.

15. The composition of claim 14 wherein the sodium ore is trona.

16. The composition of claim 14 wherein the sodium ore is nahcolite.

17. A dry granulated prefused high sodium oxide composition that does not readily absorb water or carbon dioxide and is substantially free of carbonates useful as an additive in the manufacture of glass obtained by (a) mixing trona with tailings from the trona mine and heating the mixture until substantially all of the carbonates present are decomposed to form carbon dioxide said composition consisting essentially of sodium, potassium, aluminum, magnesium, silicon and calcium oxides and being characterized by a sodium content (determined as sodium oxide) of from 25 to as much as 58 weight percent and a silica content of less than 35 weight percent, the ratio of sodium oxide to aluminum, magnesium and calcium oxides being in the range of from about 0.67:1 to about 1.13:1 and the ratio of silicon dioxide to sodium, potassium, aluminum, calcium and magnesium oxides being in the range of from about 0.35:1 to about 0.57:1, and (b) granulating the product so obtained.

18. In the manufacture of glass, the improvement which comprises adding to the glass batch a dry granulated prefused high sodium oxide composition that does not readily absorb water or carbon dioxide and is substantially free of carbonates consisting essentially of from 25 to as much as 58 weight percent sodium (determined as sodium oxide), silica in amounts less than 35 weight percent, potassium, aluminum, magnesium and calcium oxides; the ratio of sodium oxide to aluminum, magnesium and calcium oxides being in the range of from 0.67:1 to about 1.13:1 and the ratio of silicon dioxide to sodium, potassium, aluminum, calcium and magnesium oxides being in the range of from about 0.35:1 to about 0.57:1 and heating the glass batch to fusion temperature.

19. The process of claim 18 wherein the composition contains from 25 to 40 weight percent sodium (determined as sodium oxide).

20. The process of claim 19 wherein the weight ratio of sodium oxide to magnesium and calcium oxides present in the composition is from about 0.76:1 to about 1.44:1.

* * * * *

UNITED STATES PATENT AND TRADEMARK OFFICE
CERTIFICATE OF CORRECTION

PATENT NO. : 4,142,907

DATED : March 6, 1979

INVENTOR(S) : William H. Manring, Patrick M. DiBello, Eugene G. Imperato

It is certified that error appears in the above-identified patent and that said Letters Patent are hereby corrected as shown below:

Cover page, at line designated [75] Inventors:, "Patrick M. DeBello," should read --Patrick M. DiBello,--; column 2, line 20, "mangesium" should read --magnesium--; claim 2, line 1, "2" should read --1--.

Signed and Sealed this

Seventh Day of April 1981

[SEAL]

Attest:

RENE D. TEGTMEYER

Attesting Officer     Acting Commissioner of Patents and Trademarks